United States Patent [19]

Bourbonais et al.

[11] Patent Number: 4,997,720

[45] Date of Patent: Mar. 5, 1991

[54] THERMOPLASTIC COMPOSITIONS AND ARTICLES MADE THEREFROM

[75] Inventors: Edward Bourbonais, Houston; Davei Yu; Khemchand Nangrani, both of Arlington, all of Tex.

[73] Assignee: Dexter Corporation, Windsor Locks, Conn.

[21] Appl. No.: 555,551

[22] Filed: Jul. 19, 1990

Related U.S. Application Data

[63] Continuation-in-part of Ser. No. 387,407, Jul. 28, 1989, Pat. No. 4,945,005, which is a continuation of Ser. No. 32,641, March 31, 1987, abandoned.

[51] Int. Cl.$^5$ ............... C08L 63/00; C08L 63/02; C08L 71/04; C08K 3/34
[52] U.S. Cl. ..................... 428/500; 525/78; 525/108; 525/133; 525/187; 525/65; 525/68; 525/221; 524/451; 524/504; 524/508; 524/522; 428/413
[58] Field of Search ............... 428/500; 525/65, 68, 525/108, 133, 187

[56] References Cited

U.S. PATENT DOCUMENTS

| | | | |
|---|---|---|---|
| 3,384,612 | 5/1968 | Brandt et al. | 525/221 |
| 3,410,928 | 11/1968 | Baum | 525/221 |
| 3,454,676 | 7/1969 | Busse | 525/221 |
| 3,869,422 | 3/1975 | Dawes et al. | 525/221 |
| 4,277,578 | 7/1981 | Yoshimura et al. | 525/221 |
| 4,417,019 | 11/1983 | Yamamoto et al. | 524/517 |
| 4,420,580 | 12/1983 | Herman et al. | 525/221 |
| 4,584,348 | 4/1986 | Nagano | 525/221 |

FOREIGN PATENT DOCUMENTS 1009254 1/1989 Japan .

Primary Examiner—Carman J. Seccuro
Attorney, Agent, or Firm—Pennie & Edmonds

[57] ABSTRACT

Thermoplastic compositions and articles made therefrom which have a high receptivity toward automotive paints comprises the following components:
- 2%–25% of a copolymer of an ethylenically unsaturated carboxylic acid and ethylene,
- 3%–50% of an elastomer comprising an ethylene-alpha-olefin copolymer,
- 1%–50% of a crystalline homopolymer or copolymer of propylene,
- 5%–40% of polyethylene or a copolymer of ethylene and an alpha-olefin,
- 2%–20% of an epoxy or phenoxy resin; and
- optionally, up to 50% of an inorganic filler. Such articles, when injection molded, exhibit flexural moduli in the range of 100,000 to 200,000 psi and have excellent paintability, a broad range of stiffness values and high impact and tensile strengths suitable for automotive applications such as bumpers, facias and wheel covers.

16 Claims, No Drawings

THERMOPLASTIC COMPOSITIONS AND ARTICLES MADE THEREFROM

CROSS-REFERENCE TO RELATED APPLICATIONS

This application is a continuation-in-part of application Ser. No. 07/387,407, filed July 28, 1989, now U.S. Pat. No. 4945005, which is a continuation of application Ser. No. 07/032,641, filed Mar. 31, 1987, abandoned.

TECHNICAL FIELD

This invention relates to thermoplastic polymer blends and shaped articles made therefrom, e.g., by injection molding, which are receptive and adherent to preparative, protective and/or decorative coatings, e.g., automotive paints. (The term "paint" as used herein includes all types of coatings such as primers, surface treatments, adhesives, sealants, enamels, paints and the like which can be applied to the surface of an article made from the compositions of the present invention.)

DESCRIPTION OF BACKGROUND ART

Polymer blends which can be formed or shaped into lightweight and durable articles useful, for example, as automobile parts, toys, housings for various types of equipment, and the like are well known in the art. Unfortunately, with polymer blends derived from components such as polyethylene, polypropylene and rubber, it is difficult to paint articles formed therefrom so that the paint securely and durably adheres to the surface. The problem of paint adhesion is of particular concern in the case of articles made of blends derived from thermoplastic olefin ("TPO") compositions of the type disclosed, for example, in Kawai, U.S. Pat. No. 4,480,065 and Fukui et al., U.S. Pat. Nos. 4,412,016 and 4,439,573 which are expressly incorporated herein by reference thereto.

In particular, TPO compositions which are mechanical blends of synthetic rubber and polyolefins, such as polypropylene and polyethylene, are used for fabricating lightweight and durable products for use in the automotive industry and in various other applications. Because articles made from TPO compositions have gained acceptance in the automotive industry as substitutes for steel bumpers, body parts and the like, it is important to be able to paint such articles so that there is little visible difference between them and the metallic parts of the vehicle.

The utility of TPO blends would be expanded in automotive and other applications if the adhesion of paints to articles made from such blends were improved. Such other applications include flocked sheets for trunk liners and decorative rub strips which are currently being made of other plastics such as polyvinylchloride ("PVC") to which paints adhere better.

Unfortunately, articles made from polymer compositions containing substantial amounts of polyethylene (and/or polypropylene) and rubber are often difficult to paint so that the paint adheres permanently to them. In particular, most paints will either not initially adhere to the product or else peel or chip away under normal field use or high humidity conditions, or in the presence of fuels or solvents.

Various methods have been tried to make articles having substantial amounts of polypropylene and/or rubber therein more paint receptive. The use of primers or adhesion promoters as chlorinated polyolefins, and plasma surface treatment or other electronic surface treatments are examples. However, these prior methods for increasing the paint receptivity of such articles are costly and time consuming. The use of chlorinated polymers to promote adhesion between the surface of the article and the paint, as disclosed, for example, in the aforementioned U.S. Pat. No. 4,439,573, is required in state-of-the-art automotive applications; but even so, the gasoline and solvent resistance of painted TPO parts pretreated in this way has only been marginally acceptable.

It is therefore apparent that a need exists for polymer compositions that can be used to form paint receptive, durable and lightweight shaped articles which do not require surface pre-treatment.

Polymer blends derived from TPO have been used for film and packaging applications, as taught, for example, in Yoshimara et al., U.S. Pat. No. 4,454,303. Also, while prior compositions of polyolefins and copolymers of ethylene and ethylenically unsaturated carboxycic acids and ionomers have been used for improved ink adhesion and lacquer bonding, such compositions did not possess the physical properties needed for molding applications nor do they possess the high humidity resistance or high level of paint adhesion of the blends of the present invention. The present invention features the use of components which makes possible blends that are particularly suitable for injection molding. Such blends, when molded, exhibit remarkable and unexpected improvements in receptivity toward certain paints, including automotive paints, without sacrificing the other desirable properties of TPO blends.

PCT application PCT/US86/00315 discloses polymer blend formulations that can be formed to produce articles having paint receptive surfaces. The essential components of the blend are:

(A) a copolymer of ethylene and an ethylenically unsaturated carboxylic acid, (B) an elastomer which is compatible with components (B) and (C) and (C) a crystalline polypropylene homopolymer or crystalline polypropylene copolymer of ethylene wherein the ratio of the above components is such as to satisfy:

$$0.18 \leq B/(A+B) \leq 0.91$$

and $$0.43 \leq C/(A+B) \leq 1.51$$

The paint receptive properties of articles made from the above polymer blends were tested for initial paint adhesion, resistance to solvents, resistance to humidity and resistance to delamination. Test data indicate high adhesion levels resulting in highly durable shaped articles.

U.S. patent application Ser. No. 07/387,407 similarly discloses thermoplastic compositions and articles made therefrom which have a high receptivity toward automotive paints comprising the components:

of a copolymer of an ethylenically unsaturated carboxylic acid and ethylene, of an elastomer comprising an ethylene-alpha-olefin copolymer, of a crystalline homopolymer or copolymer of propylene, of polyethylene or a copolymer of ethylene and an alpha-olefin, and optionally of an inorganic filler. The paint adhesion of the articles formed from these blends, however, are often unsatisfactory under high humidity conditions over a long period of time (i.e. 240 hours).

Accordingly, it is an object of the present invention to provide polymer blends that are useful for making lightweight, durable articles having paint receptive and adherent surfaces.

Another object of the invention is to provide lightweight and durable shaped articles made from polymer blends according to the invention and having paint receptive surfaces.

Another object is to provide durably painted shaped articles made from polymer blends according to the invention.

Another object is to provide methods for producing compositions in the form of polymer blends, shaped articles made from such blends having paint-receptive surfaces, and durably painted shaped articles.

Yet another object is to provide coating systems, coating additives and surface treatments suitable for use with the compositions and articles of the invention.

These and other objects of the invention as well as the advantages thereof can be had by reference to the following description and claims.

SUMMARY OF THE INVENTION

The foregoing objects are achieved according to the present invention by the discovery of compositions useful for forming functional and decorative shaped articles such as automobile bumpers, bumper skirts, trims, wheel covers, fenders, and the like that are coatable with paint systems including those used in the automotive industry, such painted articles exhibiting excellent paint appearance and durability.

The invention includes thermoplastic compositions comprising:
(a) about 2 to 25 weight percent of a copolymer having a melt index of between 0.5 and 1500 and derived from
  (i) about 70 to 95 weight percent of ethylene and
  (ii) about 5 to 30 weight percent of an ethylenically unsaturated carboxylic acid;
(b) about 3 to 50 weight percent of an elastomeric copolymer derived from
  (i) ethylene and
  (ii) a $C_3$ to $C_{12}$ alpha-olefin;
(c) about 5 to 40 weight percent of a polymer having a melt index of between about 0.1 and 20 and selected from one or more of the group consisting of
  (i) homopolyethylene and
  (ii) a copolymer of
    (1) ethylene and
    (2) one or more of the group consisting of
      (A) a $C_3$ to $C_{12}$ alpha-olefin or
      (B) a salt of an unsaturated carboxylic acid;
(d) about 1 to 50 weight percent of a crystalline polymer having a melt flow rate of up to about 30 and selected from
  (i) a homopolypropylene,
  (ii) a polypropylene onto which has been grafted up to about 12 weight percent of an ethylenically unsaturated carboxylic acid, and
  (iii) a copolymer of
    (1) propylene and
    (2) up to about 20 mole percent of a $C_2$ to $C_{12}$ alpha-olefin; and
(e) about 2 to 20 weight percent of a resin which provides additional active sites in the composition for wetting out or reaction with organic paint systems, such as an epoxy or phenoxy resin.

More particularly, the invention includes thermoplastic compositions comprising:
(a) about 2 to 25 weight percent of a copolymer having a melt index of between 0.5 and 1500 and derived from
  (i) about 70 to 95 weight percent of ethylene, and
  (ii) about 5 to 30 weight percent of an ethylenically unsaturated carboxylic acid;
(b) about 3 to 50 weight percent of an elastomeric copolymer derived from
  (i) ethylene, and
  (ii) a $C_3$ to $C_{12}$ alpha olefin;
(c) about 3 to 50 weight percent of a crystalline polymer having a melt flow rate of up to about 30 and selected from
  (i) a homopolypropylene,
  (ii) a polypropylene onto which has been grafted up to about 12 weight percent of an ethylenically unsaturated carboxylic acid, and
  (iii) a copolymer of
    (1) propylene and
    (2) up to about 20 mole percent of a $C_2$ to $C_{12}$ alpha-olefin;
(d) about 5 to 40 weight percent of
  (i) homopolyethylene or
  (ii) a copolymer of
    (1) ethylene and
    (2) one or more of the group consisting of
      (A) a $C_3$ to $C_{12}$ alpha-olefin, or
      (B) a salt of an unsaturated carboxylic acid, or
      (C) an ester of an unsaturated carboxylic acid;
(e) about 2 to 20 weight percent of an epoxy or phenoxy resin; and
(f) about 5 to 50 weight percent of an inorganic filler.

Component (a) is a thermoplastic copolymer of an ethylenically unsaturated carboxylic acid and ethylene having a melt index ("MI") (ASTM D-1238 @190° C.) range of 0.5 to 1500, and preferably between about 10 and 300, with the ethylenically unsaturated carboxylic acid comonomer weight percent ranging from 5 to 30 weight percent. Additional monomers can be polymerized into this copolymer. These copolymers can also contain low levels of metallic salts of unsaturated carboxylic acids such as sodium or zinc salts.

Component (b) is a thermoplastic elastomeric random copolymer of ethylene with at least one alpha-olefin having from 3 to 12 carbon atoms such as polypropylene and 1-butene. This elastomer can be further copolymerized with a small amount of one or more polyunsaturated hydrocarbons such as 1,4-butadiene, isoprene, 1,4-hexadiene, ethylidene norbornene, and the like. In these component (b) copolymers, the ethylene content desirably falls in the range of from 70 to 90 mole percent, preferably from 65 to 85 mole percent. The elastomer can also be selected from copolymers of styrene and butadiene. Less preferred but also suitable are polyisoprene, bromobutyl rubber, and nitrile rubber. A combination of these elastomers can also be used.

The density of these elastomeric copolymers should be between about 0.85 and 0.92 g/cm$_3$ and typically is about 0.90 to 0.92 g/cm$_3$, with a density of 0.91 g/cm$_3$ being especially preferred. The crystallinity in the rubbery zone generally ranges from substantially amorphous to low partial crystallinity on the order of not more than 30% crystallinity as determined by X-ray analysis.

Especially preferred as component (b) is a copolymer of ethylene and propylene and which can, if desired, have incorporated therein a small amount of a diene. The elastomer possesses a melt index (ASTM D-1238 @190° C.) of from 0.1 to 10, preferably from 0.2 to 6.

Component (c) is a crystalline homopolymer or one or more crystalline copolymers of propylene with to about 20 mole percent ethylene or other alpha-olefin having up to about 12 carbon atoms. For applications where large parts are injection molded, the melt flow rate ("MFR") (ASTM D-1238 Condition L @230° C.) of component (c) is preferably between 5 and 30, preferably from about 8 to 20. For small parts, MFR's of less than 1 are suitable.

In some cases random and block copolymers of propylene and ethylene can be used to modify physical properties. A particularly useful example of this is polypropylene which has been graft polymerized with up to about 12 weight percent acrylic acid or methacrylic acid. Such copolymers assist dispersing of the components in the blend and increase the flexural moduli of articles molded therefrom.

Component (d) is a polyethylene or a copolymer of ethylene produced by a medium or low pressure process and having a density ranging from 0.88 to 0.97 g/cm$_3$. Suitable copolymers are commercially available. The comonomers can be alpha-olefins having from 3 to 12 carbon atoms. Other suitable ethylene copolymers are ionomers made by converting the carboxylic acid functional groups in copolymers of ethylene and ethylenically unsaturated carboxylic acids to metallic salts such as sodium or zinc salts, as typified by DuPont's Surlyn resins. Also suitable, albeit less desirable, are ethylene-ethyl acrylate copolymers. Component (e) desirably possesses a melt index in the range of 0.1 to 20.

Component (e) is a resin which is compatible with carboxylic acid functional polyolefin copolymer systems. The incorporation of this resin provides additional active sites for wetting out or reaction with plastic paint systems, particularly melamine, polyurethane, polyester, isocyanate and the like. This consequently allows the overall thermoplastic composition to have increased paint adhesion properties especially under long term humidity environments. Additionally, the incorporation of the resin partially neutralizes the carboxylic acid functional groups of the polyolefin system thereby diminishing the corrosion problems associated with carboxylic acid functional polyolefin systems.

Typical resins for use in the invention are the well-known epoxy resins, hydroxy cellulose and the phenoxy resins, including modified phenoxy.

The foregoing compositions of the present invention have excellent paintability, a broad range of stiffness values and high impact and tensile strengths suitable for automotive applications such as bumpers, fenders, facias and wheel covers. The polymer compositions of this invention can be molded or otherwise formed or shaped to produce articles that are lightweight, durable, and have surfaces that are paint receptive whereby the articles can be painted and the paint cured at temperatures exceeding 250° F. and the paint coat will adhere to the articles to produce a durable and attractive finish. Compositions formulated in accordance with the invention can withstand elevated temperatures as high as 250° F. and above. A composition withstands such a temperature when it does not thermally degrade, as by charring, or distort in shape to the point where it is not usable for its intended function (including fitting with other parts) at that temperature or when cooled down.

Component (f) is an inorganic finely divided filler such as talc, mica, glass, or silica, or mixture of fillers. Talc and milled glass are the preferred fillers.

In addition to the aforementioned required components, other compatible polymers, other fillers, reinforcing agents, pigmenting agents, stabilizers and the like can be added to the composition. For example, processing aids such as metal carboxylates, may be added to further improve paint adhesion. Also found to improve paint adhesion is the use of titanate coupling agents with the filler.

It has also been discovered that paints which adhere best to articles made of the present compositions are those containing active substituents which react with the carboxylic acid functional group of the ethylene-acrylic acid and ethylene-methacrylic acid copolymers of component (a). Examples of such active paint constituents include epoxy resins, carbodiimides, urea resins, melamine-formaldehyde resins, enamines, ketimines, amines, and isocyanates. These and other paint constituents capable of reacting with hydroxy and carboxylic acid functional groups are well known in the paint and coatings industry and have been used not only to impart adhesion of the paint to substrates but also to react with free carboxylic acid groups to prevent undesirable acid catalyzed reactions.

Polymer compositions useful for producing shaped, paint receptive motor vehicle parts such as wheel covers, for example, are molded from a blend of components (a), (b), (c), (d), (e) and (f). Various other compatible polymers, fillers, reinforcing agents, stabilizers and pigment materials can be added to the polymer composition with the resulting polymer blend being formable (e.g., by injection molding) into shaped articles that have highly paint receptive surfaces.

The preferred component (a) copolymers are ethylene-acrylic acid copolymers ("EAA") and ethylene-methacrylic acid copolymers ("EMAA"). These include conventional ethylene and acrylic acid copolymers and ethylene and methacrylic acid copolymers, or mixtures or blends thereof. Such materials are usually produced by the free radical copolymerization of ethylene with acrylic acid or ethylene with methacrylic acid. The resulting copolymers have carboxylic acid groups along the backbone and/or side chains of the copolymer. Ethylene-acrylic acid copolymers or ethylene-methacrylic acid copolymers preferred for use in the invention have at least about 5 percent by weight of acrylic acid or methacrylic acid monomer units in the polymer chain. Copolymers having lower acid content can be also be used, although this is less desirable; for example, higher homologs of the above described ethylene-methacrylic acid copolymers such as ethylene-ethacrylic acid or ethylene propacrylic acid copolymers can be used.

The melt index of the ethylene acrylic acid or ethylene-methacrylic acid copolymers is in the range of about 0.5 to 1500. The preferred melt index is between about 5 and 300, and most preferably between about 10 and 300. A melt index between about 5 and 300 is preferred for large part injection molding applications. For applications where small parts are molded and/or more tensile strength or impact strength is needed, melt indices of 0.5 to 5 are preferred. For such small part applications the melt index of components (b), (c), and (e) should also be low to facilitate dispersion during compounding.

Component (a) is required at a minimum of about 2 weight percent and a maximum of about 25 weight percent to achieve acceptable initial paint adhesion. The preferred range is 7 to 20% for good humidity resistance. Above 25%, impact strength of most blends is adversely affected.

Component (b), the elastomer component of the instant invention, can be any elastomer that is compatible or can be rendered compatible with the other ingredients of the blend. For example, the elastomer component can be ethylene-propylene, ethylene-propylene-diene monomer, styrene-butadiene-styrene, acrylonitrile-butadiene, bromobutyl rubber, etc. The term "compatible" is intended to mean that when the components of the blend are combined, the resultant blend can be molded, extruded or otherwise formed or shaped into commercially useful articles.

A wide range of elastomers can be used. The primary requirements are (1) the elastomer should be of a low enough viscosity so that it can be dispersed into component (e) and/or component (c). The use of fillers and coupling agents renders chemically dissimilar components compatible enough to be suitable in many cases. Elastomers which offer the best compromise of cost and performance are the ethylene-propylene rubbers and styrene-butadiene rubbers. The optimum melt viscosity of the elastomer varies with the melt viscosity of the other components. Generally, as the melt indices of components (a), (c), and (d) are reduced, so should the melt index of the elastomer be reduced to maintain an optimum balance of paint adhesion and physical properties.

The following is a list of commercially available elastomers which are suitable for use in the invention:

| Name | Type | Supplier |
|---|---|---|
| Polysar 306 | Ethylene-Propylene | Polysar |
| Polysar X2 | Bromobutyl Rubber | Polysar |
| Krynac 19.65 | Nitrile Rubber | Polysar |
| Nordel 2722 | Ethylene-Propylene-Hexadiene | DuPont |
| Vistalon 719 | Ethylene-Propylene | Exxon |
| Kraton G 11650 | Styrene-Ethylene-Butadiene Styrene | Shell |
| Stereon 840 A | Styrene-Butadiene | Firestone |
| GE 7340 | Hydrogenated Styrene-Butadiene | Goldsmith & Eggleton |
| Natsyn 2200 | Polyisoprene | Goodyear |
| Dutral CO-038 | Ethylene-propylene | Ausimont |

The elastomer component is used at levels ranging from 3 to 50 weight percent. The preferred range is about 10 to 25 weight percent. Below 3 weight percent paint adhesion and durability are poor.

The polypropylene component (c) of the present invention includes conventional polypropylenes having melt flow rates (ASTM D-1238 Condition L @230° C.) of desirably from about 0.1 to about 35 and preferably from about 8 to 20. Polypropylenes having melt flow rates in this range can be blended effectively with the other components to produce polymer compositions that can be effectively molded or extruded, or otherwise shaped to produce low cost, lightweight articles that are paint receptive. The polypropylene component of the invention can be either a homopolymer of propylene or it can be a copolymer of propylene. When a copolymer of propylene and ethylene is utilized as the polypropylene component, the copolymer can either be a random or block copolymer or a graft copolymer such as described above.

When the polypropylene component of the invention is increased beyond about 75 weight percent of the total composition, initial paint adhesion becomes unacceptable, although physical properties for most applications begin to deteriorate beyond about 50 weight percent polypropylene. For some random copolymers of polypropylene and ethylene, good initial adhesion can be achieved up to 85 weight percent thereof in the blend; however, the physical properties begin to suffer beyond about 50 weight percent of the blend.

The minimum level of component (c) is dictated by the oven bake temperature. To withstand a bake temperature of 180° F., no polypropylene is required if HDPE is used in component (e). Additionally, the HDPE may be crosslinked by electron beam radiation or by chemical means to reduce sagging or distorting at high bake temperatures. To withstand oven bake temperatures of 250° F., most compositions will require at least about 30% of component (c) with a minimum of 9% being homopolymer or 13% being a highly crystalline block copolymer or a graft copolymer.

The polyethylene and polyethylene copolymers of component (d) are used primarily to help disperse the rubber and the ethylene and ethylenically unsaturated carboxylic acid copolymers, and also to help achieve desirable physical properties such as tensile strength and impact strength. This component is also necessary to achieve acceptable humidity resistance. For most automotive applications, a weight range of 5 to 40 weight percent is preferred. Most preferred is 10 to 30 weight percent. For high flexural modulus products, HDPE is preferred. For articles having low flexural moduli, ionomer resins are preferred.

The melt index of component (d) is between about 0.1 and 20, and preferably between about 8 and 12 for injection molding applications.

The resin component (e) includes any of a wide variety of materials that contain an epoxy or oxirane group as follows:

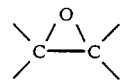

Standard epoxy resins based on epichlorohydrin-bisphenol A copolymers are suitable, as are the high molecular weight difunction types which are known as phenoxy resins. Hydroxy cellulose or modified phenoxy variations of the phenoxy resins can also be used, if desired, to take advantage of the particular properties of the modified material.

The most common epoxy resins are those based on the reaction of bisphenol A and excess epichlorohydrin in the presence of a base such as sodium hydroxide, to form liquid polymers with epoxy end groups. These liquid resins can be reacted with further bisphenol A by chain extension to form solid epoxy resins.

The phenoxy resins (also called polyhydroxyethers) which are suitable in the invention include linear thermoplastic resins made by reacting an exact stoichiometric equivalent of epichlorohydrin with bisphenol A and sodium hydroxide in a solvent. These resins are chemically similar to epoxy resins except that no epoxy groups are present and that they have relatively higher molecular weights. These resins are difunctional containing hydroxyl groups which permit crosslinking reactions to occur.

Hydroxy cellulose resins, such as Klucel ® resin from Aqualon Company and modified phenoxy resins, such as PM-10 from Union Carbide are suitable for use as component (e) of the invention. Modified epoxy resins, such as Shell Chemical's EPON ® 1000, can also be used, however, the phenoxy or modified phenoxy resins are most preferred.

The filler, component (f) can be used from 0 to about 50 weight percent. Basic fillers or fillers which can react with the carboxylic acid functional groups tend to reduce paint adhesion. Neutral or non-reactive fillers such as mica, glass, silica, talc, or phosphate fiber do not suffer these drawbacks and are able to control flexural modulus and to aid in dispersion of the various components. Talc is the preferred filler because of its ability at low concentrations to impart high flexural modulus to injection molded articles.

The filler is necessary to achieve maximum paint adhesion and resistance to humidity. The preferred range for achieving acceptable humidity resistance of painted parts is 5 to 50 weight percent, and more preferably 8 to 35 weight percent for overall properties.

Various other materials can be incorporated into the polymer blends of the invention. Such materials can include other compatible polymers, pigments, dyes, processing aids, antistatic additives, surfactants and stabilizers generally used in polymeric compositions. Particularly useful for improving humidity resistance of these blends are styrene-maleic anhydride copolymers and a wide variety of cationic surfactants. These minor components are each used at less than 2 weight percent and preferably less than 1 weight percent. They afford greater latitude for optimizing physical properties while also maintaining good paint adhesion.

It will of course be understood that mixtures of various materials that fall within the aforementioned recitations of components and proportions can also be used. For example, the polypropylene component of the invention can be a blend or a mixture of various polypropylenes such as a blend of homopolypropylene with various propylene copolymers.

The blending or mixing of the various components of the invention can be carried out using conventional mixing equipment such as Banbury mixers, as well as extrusion mixing equipment. It will be understood that the polymer blends of the instant invention can be blended and then pelletized for easy storage, shipment and subsequent use.

The polymer blends of the invention can be made into useful articles by any known means such as by extrusion, injection molding, blow molding, or thermoforming. The preferred method is injection molding.

It is believed that injection molded articles made from the present polymer blends exhibit of a polymer matrix having co-continuous phases within it. Without wishing to be bound by theory, it is believed that such morphology stems from the relatively low levels of crystalline polypropylene and high levels of filler in these blends. It is known that similar polymer blends containing low amounts of filler or which have been inadequately mixed exhibit a laminar morphology in addition to the co-continuous phases. (See, e.g., U.S. patent application Ser. No. 07/387,407, the content of which is expressly incorporated herein by reference thereto).

This laminar morphology, which is usually observed in photomicrographs of surfaces of impacted specimens, gives acceptable paint adhesion and physical properties only if the thickness of the individual layers or lamellae remains small. When the thickness of such layers becomes greater, impact strength and paint adhesion are both reduced. The preferred morphology is believed to be a combination of co-continuous and laminar phases with the latter being kept to a minimum. This type of morphology is achieved and can be controlled by the use of fillers and the careful selection of the viscosities of the polymer components.

Once the blends have been formed into shaped articles, the latter can be coated with conventional paints, preferably those containing ingredients that will react sufficiently with the carboxylic acid groups and hydroxy groups in the blend or be of sufficiently high molecular weight so as to anchor themselves in the polymer matrix of the blend. As mentioned previously, such components can include melamine-formaldehyde resins, epoxides, carbodiimides, enamines, ketimines, amines, isocyanates or any material that has functional groups capable of reacting with carboxylic acids group and hydroxy groups.

The shaped articles can also be pre-treated with additives that will react with the carboxylic acid and hydroxy groups prior to painting for the purpose of improving paint adhesion. Such treatment can include primers such as epoxy or urethane primers and their components. The paint will adhere to the article to form a durable and tough finish that will resist peeling, chipping, high humidity conditions and gasoline. It has been found that the polymer blends of this invention are especially useful for producing finished articles that are painted with urethane-polyester paints, such as PPG Industries Durethane 700 HSE (High Solids Enamel).

The preferred paint system is cured with melamine-formaldehyde cross-linking agents such as Cymel 303 made by American Cyanamid Corp., or other urea resins. Such paints require baking temperatures of about 250° F. Although lower bake temperatures can be used to crosslink the coating, a minimum temperature of 250° F. is usually required to effect the reaction between the carboxylic acid or hydroxy of the substrate and the malamine formaldehyde resin of the paint.

The composition of the paint system is important. Certain additives and pigments tend to poison the reaction by being absorbed adsorbing onto the acidic substrate and thereby preventing the desired reaction from occurring. Uniform results are achieved by using a primer having none of the undesirable additives. The primer can then be top-coated with a variety of paint systems.

If the paint system is chosen carefully, a single coating (without primer) can achieve excellent results on articles made according to the invention.

DESCRIPTION OF PREFERRED EMBODIMENTS

The following formulation illustrates a polymer blend of the present invention:

|  | A | Most Preferred Range |
|---|---|---|
| EMMA | 12 | 7–20 |

-continued

|  | A | Most Preferred Range |
|---|---|---|
| EP Rubber | 17 | 10–25 |
| HDPE | 20 | 10–30 |
| Polypropylene | 20 | 10–40 |
| Phenoxy Resin | 7 | 5–10 |
| talc | 20 | 10–30 |
| Stabilizers/Additives | 4 | 2–7 |

The formulation in column A represents polymer blends having flexural moduli ranging from 100,000 psi to 200,000 psi.

To demonstrate the paint receptive properties of articles made from the polymer blends of this invention, several non-limiting examples are given below. In all of the examples, the various polymer blends are prepared by combining the stated components in the amounts indicated and then subjecting them to intensive mixing in a Banbury mixer or in an extruder. After the mixing step, the blends are injection molded to form test plaques measuring approximately 3"×6"×0.125".

In preparing the test plaques for painting, the surfaces of the plaques are first wiped clean with a solvent of isopropanol or methylethylketone (MEK). After the solvent has evaporated from the surface, the test plaques are painted with PPG Industries Durethane HSE 9440 enamel by spraying the paint in two passes to coat entirely the plaque surface with each pass. A 1.5 to 2 minute flash time is allowed between each of the passes. The dry film thickness of the paint is between about 1.5 to about 1.8 mils. Durethane HSE 9440 paint is a high solids elastomeric enamel that is composed of a polyester urethane backbone. Following the application of both coats of the paint to the surface of the test plaques, the plaques were cured by baking at 250° F. for 30 minutes.

Four separate tests are made to evaluate the paint receptive qualities of the test plaques.

TEST I

In the first test, paint adhesion after 24 hours is evaluated by taking a test plaque and, using a razor knife, cutting X-shaped cross hatch marks through the paint film to the surface of the plaque. Thereafter, Permacel P-703 tape is applied to the cut area while pressing the tape down with a fingernail or by rubbing the backside of the tape with a pencil eraser. The tape is then removed by rapidly pulling the tape at a 90 angle to the surface to the test plaque. Following the removal of the tape, the plaque surface is examined for paint removal. The number of squares removed divided by the total number of squares in the cross hatch area (usually 25) is reported. This first test is used as a quick screening method to evaluate various blends and various paint systems.

TEST II

In the second test to evaluate paint adhesion, a solvent resistance test is utilized. This solvent resistance test has been referred to in the automotive industry as the "Fisher-Body" method. In conducting the test, a painted plaque is immersed in a mixture of 55% naphtha and 45% toluene. Following immersion in the naphtha-toluene mixture for 10 seconds, the test plaque is removed and dried in the air for 20 seconds. During the drying cycle, scratches with a fingernail or dull knife are attempted over the painted surface. The solvent resistance test is repeated for a number of cycles wherein the test plaque was alternately dipped in the naphtha-toluene for 10 seconds and then allowed to air dry for 20 seconds while the scratching is carried out. Any paint removal resulting from such scratching terminates the test. The results of the solvent resistance test are given in the number of cycles occurring until there is a removal of the paint from the test plaque.

TEST III

The third test evaluates the adhesion of paint to the polymer blends of this invention under conditions of high humidity using test plaques that were painted in accordance with the above-mentioned procedure. The painted plaques are placed in a humidity chamber that has been maintained at 100% humidity at 38° C. The plaques are removed after 240 hours of exposure and examined for blisters, dulling of paint or any change in paint appearance. Thereafter, a razor knife is used to cut X-shaped cross hatches through the paint film to the surface of the plaque and Permacel P-703 tape was applied to the cut area while pressing down with a fingernail or rubbing the backside of the tape with a pencil eraser. The tape is then removed by rapidly pulling the tape at a 90 degree angle to the surface of the test plaque. Any removal of the paint from the cut area is reported as a fraction of the total number of squares in the cross hatch area. In carrying out this humidity resistance test, the examination of the appearance of the plaques and adhesion of paint thereto is carried out within 10 minutes after the removal of the test plaque from the humidity chamber.

TEST IV

The fourth test measures the force in lbs./in. to peel a 1" wide strip of coating from the test plaques. The test is begun by pressing a 1" wide strip of tape onto the painted surface. A scribe along each side of the tape is made in the opposite direction of pull. The delamination of the paint from the plaque is initiated by raising the leading edge of the paint with a sharp metal blade. Once started, tape is attached to the backside of the delaminated paint and secured to the traversing clamp of an Instron unit. Using an Instron with a load cell of 0–20 lbs. the paint is pulled at a 90 angle to the plaque. Using coating thicknesses of 1.5–2.0 mils, values up to 5.0 lbs/in. are measured. Test I, a method used by the automotive industry to evaluate paint durability, gives paint delamination at adhesion levels up to 0.7 lbs/in. In some cases, however, paints that had adhesion values of only 0.3 lbs/in. passed Test I. This appears to be caused by the tendency of the razor blade to force the coating into some of the softer substrates, thereby making it more difficult for the tape to pull it free.

Using the automotive industry guidelines, adhesion levels of 0.8 lbs/in. or greater are considered as being highly durable.

EXAMPLE

As shown below, the addition of the phenoxy component (e) results in painted parts having significantly improved paint adhesion properties.

|  | Control | Invention |
|---|---|---|
| EMMA | 12 | 12 |
| EP Rubber | 17 | 17 |
| HDPE | 20 | 20 |

|  | Control | Invention |
|---|---|---|
| Polypropylene | 27 | 20 |
| Phenoxy | — | 7 |
| talc | 20 | 20 |
| Stabilizer | 4 | 4 |
| Initial Adhesion Test | Fails | Passes |
| 240 hr humidity exposure | Poor | Excellent |

A reduction in corrosion of molding equipment over time for polymer blend formulation containing the phenoxy resin component (e).

The corrosion test was carried out as follows:

APPARATUS

1. Oven: With uniformity of temperature within ±1% of the differential between oven and ambient temperature.
2. Dropper - 1 ml size
3. Glass Tube - 25 mm diameter × 200 mm length with plastic cap.
4. Metal strip - copper or stainless steel strip, 6 mm width, 170 mm length.

REAGENTS

1. Distilled water
2. Acetone

SPECIMEN PREPARATION

1. Pellet form of plastic material with uniform particle size.

PROCEDURE

1. Using acetone, wipe the surface of the metal strip.
2. Add pellet form of plastic material into the glass tube about 100 mm of the length of the glass tube.
3. Insert the metal strip into the glass tube and make sure the metal strip is surrounded by plastic material.
4. Add 4 drops of distilled water into the glass tube.
5. Close the cap of the glass tube.
6. Place the sealed glass tube in an oven at 250° F. (121° C.) for a total of 48 hours.
7. At the end of 48 hours, remove the glass tube from the oven and allow to cool to 23°±2° C.
8. Take out the metal strip from the glass tube.
9. Investigate the corrosion on the surface of the metal strip.

This test is similar to ASTM D4350-86, "Corrosivity Index of Plastics and Fillers."

The extent of corrosion of the metal strip observed with the phenoxy resin containing formulation of the invention is about 30–40% less than the comparative formulation that does not contain the phenoxy resin.

The formulations of the example were also subjected to the tests described above, with the following results:

Test I - The formulation of the invention was found to have a rating of 0/25, whereas the control was found to be 7/25. Thus, the invention exhibits substantially increased adhesion.

Test II - Although not completed at the time of filing, it is believed that the gasoline resistance of the control and the invention are essentially identical.

Test III - No paint was pulled off from either formulation.

Test IV - No paint was pulled off from either formulation.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

We claim:

1. A thermoplastic composition comprising:
   (a) about 2 to 25 weight percent of a copolymer having a melt index of between 0.5 and 1500 and derived from
      (i) about 70 to 95 weight percent of ethylene and
      (ii) about 5 to 30 weight percent of an ethylenically unsaturated carboxylic acid;
   (b) about 3 to 50 weight percent of an elastomeric copolymer derived from
      (i) ethylene and
      (ii) a $C_3$ to $C_{12}$ alpha-olefin;
   (c) about 5 to 40 weight percent of a polymer having a melt index of between about 0.1 to 20 and selected from one or more of the group consisting of
      (i) homopolyethylene and
      (ii) a copolymer of
         (1) ethylene and
         (2) one or more of the group consisting of
            (A) a $C_3$ to $C_{12}$ alpha-olefin,
            (B) a salt of an unsaturated carboxylic acid, and
            (C) an ester of an unsaturated carboxylic acid;
   (d) about 1 to 50 weight percent of a crystalline polymer, said polymer enabling the thermoplastic composition to withstand an oven bake temperature of greater than 180° F., having a flow rate of up to about 30, and selected from one or more of the group consisting of
      (i) a homopolypropylene,
      (ii) a polypropylene onto which has been grafted up to about 12 weight percent of an ethylenically unsaturated carboxylic acid, and
      (iii) copolymer of
         (1) propylene and
         (2) up to about 20 mole percent of a $C_2$ to $C_{12}$ alpha-olefin; and
   (e) about 2 to 20 weight percent of a phenoxy or epoxy resin which provides additional active sites in the composition for wetting out or reaction with organic paint systems.

2. The composition of claim 1 further comprising an inorganic filler in an amount of up to about 50 weight percent.

3. The composition of claim 1 wherein the active site producing resin (e) is an epoxy resin.

4. The composition of claim 1 wherein the active site producing resin (e) is a phenoxy resin.

5. A thermoplastic composition comprising:
   (a) about 2 to 25 weight percent of a copolymer having a melt index of between 0.5 and 1500 and derived from
      (i) about 70 to 95 weight percent of ethylene and
      (ii) about 5 to 30 weight percent of an ethylenically unsaturated carboxylic acid;
   (b) about 3 to 50 weight percent of an elastomeric copolymer derived from
      (i) ethylene and
      (ii) a $C_3$ to $C_{12}$ alpha-olefin;
   (c) about 3 to 50 weight percent of a crystalline polymer to enable the thermoplastic composition to withstand an oven bake temperature of greater than 180° F., said polymer having a flow rate of up to about 30 and selected from one or more of the group consisting of
      (i) a homopolypropylene, (ii) a polypropylene onto which has been grafted up to about 12 weight percent of an ethylenically unsaturated carboxylic acid, and (iii) a copolymer of
  (1) propylene and
  (2) up to about 20 mole percent of a $C_2$ to $C_{12}$ alpha-olefin;

(d) about 5 to 40 weight percent of a polymer having a melt index of between about 0.1 to 20 and selected from one or more of the group consisting of
  (i) homopolyethylene and
  (ii) a copolymer of
    (1) ethylene and
    (2) one or more of the group consisting of
      (A) a $C_3$ to $C_{12}$ alpha-olefin,
      (B) a salt of an unsaturated carboxylic acid, and
      (C) an ester of an unsaturated carboxylic acid; and (e) about 2 to 20 weight percent of an epoxy or phenoxy resin.

6. The composition of claim 5 further comprising an inorganic filler in an amount of between about 5 to 50 weight percent.

7. A composition according to claim 6 comprising:
(a) about 7 to 20 weight percent of an ethylene-methacrylic acid copolymer having a melt index of between 10 and 300;
(b) about 10 to 25 weight percent of an ethylene-propylene rubber;
(c)
  (i) about 10 to 15 weight percent of polyproplene having a melt flow rate of between 10 and 15,
  (ii) about 5 to 10 weight percent of an acrylic acid grafted polypropylene, and
  (iii) about 15 to 20 weight percent of a copolymer of
    (1) about 95 to 99 mole percent propylene and
    (2) about 1 to 5 mole percent ethylene,
(d)
  (i) about 10 to 30 weight percent high density polyethylene, and
  (ii) about 5 to 15 weight percent of a copolymer of
    (1) ethylene and
    (2) a metal salt of methacrylic acid,
(e) about 5 to 10 weight percent of an epoxy or phenoxy resin; and
(f) about 10 to 20 weight percent of an inorganic filler.

8. A composition according to claim 7 wherein the inorganic filler is glass or talc.

9. A composition according to claim 6 wherein compound (a) is an ethylene-acrylic acid copolymer or ethylene methacrylic acid copolymer; component (b) is an ethylene-propylene rubber; component (c) is polypropylene; and component (d) is high density polyethylene.

10. A composition according to claim 5 further comprising one or more of the following additives:

(g) about 0.5 to 1 weight percent styrene-maleic anhydride copolymer;
(h) about 0.1 to 0.2 weight percent nucleating agent;
(i) about 0.1 to 0.5 weight percent quarternary ammonium surfactant;
(j) about 0.1 to 2 weight percent antioxidant; and
(k) about 0.01 to 0.5 weight percent titanate coupling agent.

11. A thermoplastic composition comprising:
(a) about 7 to 20 weight percent of a copolymer having a melt index of between 0.5 and 1500 and derived from
  (i) about 70 to 95 weight percent of ethylene and
  (ii) 5 to 30 weight percent of an ethylenically unsaturated carboxylic acid;
(b) about 10 to 25 weight percent of an elastomeric copolymer derived from
  (i) ethylene and
  (ii) a $C_3$ to $C_{12}$ alpha-olefin;
(c) about 10 to 30 weight percent of a polymer having a melt index of between about 0.1 to 20 and selected from one or more of the group consisting of
  (i) homopolyethylene and
  (ii) a copolymer of
    (1) ethylene and
    (2) one or more of the group consisting of
      (A) a $C_3$ to $C_{12}$ alpha-olefin;
      (B) a salt of an unsaturated carboxylic acid, and
      (C) an ester of an unsaturated carboxylic acid;
(d) about 10 to 40 weight percent of a crystalline polymer, said amount being sufficient to enable the thermoplastic composition to withstand an oven bake temperature of greater than 180° F., said polymer having a flow rate of up to about 30 and selected from one or more of the group consisting of
  (i) a homopolypropylene,
  (ii) a polypropylene onto which has been grafted up to about 12 weight percent of an ethylenically unsaturated carboxylic acid, and
  (i) a copolymer of
    (1) propylene and
    (2) up to about 20 mole percent of a $C_2$ to $C_{12}$ alpha-olefin;
(e) about 5 to 10 weight percent of an epoxy or phenoxy resin; and
(f) about 10 to 30 weight percent of an inorganic filler.

12. A thermoplastic composition according to claim 11 wherein the component (a)(ii) is selected from one or more of the group consisting of sodium and zinc salts of methacrylic acid.

13. A composition according to claim 12 wherein the inorganic filler is glass or talc.

14. A composition according to claim 13 further comprising about 0.5 to 10 weight percent styrene-maleic anhydride copolymer.

15. A shaped article made from a thermoplastic composition according to one of claims 1, 5 or 11.

16. An article according to claim 15 having one or more painted surfaces.

* * * * *

UNITED STATES PATENT AND TRADEMARK OFFICE
CERTIFICATE OF CORRECTION

Page 1 of 4

PATENT NO. : 4,997,720
DATED : March 5, 1991
INVENTOR(S) : Bourbonais, et. al.

It is certified that error appears in the above-indentified patent and that said Letters Patent is hereby corrected as shown below:

Column 3, lines 51-59 should read as follows:

(c) about 1 to 50 weight percent of a crystalline polymer having a melt flow rate of up to about 30 and selected from (i) a homopolypropylene (ii) a polypropylene onto which has been grafted up to about 12 weight percent of an ethylenically unsaturated carboxylic acid, and (iii) a copolymer of (1) propylene and (2) up to about 20 mole percent of a $C_2$ to $C_{12}$ alpha-olefin;

Columns 3-4, lines 60-68 and 1-2 should read as follows:

(d) about 5 to 40 weight percent of a polymer having a melt index of between about 0.1 and 20 and selected from one or more of the group consisting of (i) homopolyethylene and (ii) a copolymer of (1) ethylene and

UNITED STATES PATENT AND TRADEMARK OFFICE
CERTIFICATE OF CORRECTION

PATENT NO. : 4,997,720
DATED : March 5, 1991
INVENTOR(S) : Bourbonais, et. al.

It is certified that error appears in the above-indentified patent and that said Letters Patent is hereby corrected as shown below:

(2) one or more of the group consisting of
   (A) a $C_3$ to $C_{12}$ alpha-olefin or (B) a salt of an unsaturated carboxylic acid; or
   (C) an ester of an unsaturated carboxylic acid;
Column 14, claim 1, lines 15-39 should read as follows:

(c) about 1 to 50 weight percent of a crystalline polymer, said polymer enabling the thermoplastic composition to withstand an oven bake temperature of greater than 180° F, having a flow rate of up to about 30, and selected from one or more of the group consisting of (i) a homopolypropylene (ii) a polypropylene onto which has been grafted up to about 12 weight percent of an ethylenically unsaturated carboxylic acid, and (iii) copolymer of (1) propylene and (2) up to about 20 mole percent of a $C_2$ to $C_{12}$ alpha-olefin;

(d) about 5 to 40 weight percent of a polymer having a melt index of between about 0.1 to 20 and selected from one or more of the group consisting of (i) homopolyethylene and

UNITED STATES PATENT AND TRADEMARK OFFICE
CERTIFICATE OF CORRECTION

Page 3 of 4

PATENT NO. : 4,997,720
DATED : March 5, 1991
INVENTOR(S) : Bourbonais, et. al.

It is certified that error appears in the above-indentified patent and that said Letters Patent is hereby corrected as shown below:

(ii) a copolymer of
   (1) ethylene and
   (2) one or more of the group consisting of
     (A) a $C_3$ to $C_{12}$ alpha-olefin,
     (B) a salt of an unsaturated carboxylic acid, and
     (C) an ester of an unsaturated carboxylix acid; and Column 16, claim 11, lines 20-44, should read as follows:

(c) about 10 to 40 weight percent of a crystalline polymer, said amount being sufficient to enable the thermoplastic composition to withstand an oven bake temperature of greater than 180° F., said polymer having a flow rate of up to about 30 and selected from one or more of the group consisting of (i) a homopolypropylene, (ii) a polypropylene onto which has been grafted up to 12 weight percent of an ethylenically unsaturated carboxylic acid, and (iii) a copolymer of (1) propylene and (2) up to 20 mole percent of a $C_2$ to $C_{12}$ alpha-olefin;

(d) about 10 to 30 weight percent of a polymer having a melt index of between about 0.1 to 20 and selected from one or more of the group consisting of

UNITED STATES PATENT AND TRADEMARK OFFICE
CERTIFICATE OF CORRECTION

PATENT NO. : 4,997,720
DATED : March 5, 1991
INVENTOR(S) : Bourbonais, et. al.

It is certified that error appears in the above-indentified patent and that said Letters Patent is hereby corrected as shown below:

(i) homopolyethylene and (ii) a copolymer of (1) ethylene and (2) one or more of the group consisting of (A) a $C_3$ to $C_{12}$ alpha-olefin;

(B) a salt of an unsaturated carboxylic acid, and (C) an ester of an unsaturated carboxylic acid;

Signed and Sealed this

Twenty-sixth Day of September, 1995

Attest:

BRUCE LEHMAN

Attesting Officer      Commissioner of Patents and Trademarks